US008041016B2

(12) United States Patent
Trell

(10) Patent No.: US 8,041,016 B2
(45) Date of Patent: Oct. 18, 2011

(54) METHOD AND DEVICE FOR ACCESS COMMUNICATION/CONTROL

(75) Inventor: Anders Edvard Trell, Stockholm (SE)

(73) Assignee: Anders Trell Trust, Buffalo, NY (US)

( * ) Notice: Subject to any disclaimer, the term of this patent is extended or adjusted under 35 U.S.C. 154(b) by 687 days.

(21) Appl. No.: 10/553,850

(22) PCT Filed: Feb. 22, 2005

(86) PCT No.: PCT/SE2005/000236
§ 371 (c)(1),
(2), (4) Date: Oct. 20, 2005

(87) PCT Pub. No.: WO2005/104516
PCT Pub. Date: Nov. 3, 2005

(65) Prior Publication Data
US 2006/0233330 A1    Oct. 19, 2006

(30) Foreign Application Priority Data

Apr. 21, 2004    (SE) ...................................... 0401035

(51) Int. Cl.
*H04M 9/00* (2006.01)
(52) U.S. Cl. .................................. 379/167.07; 455/420
(58) Field of Classification Search ............. 379/102.06, 379/167.05; 455/420, 440
See application file for complete search history.

(56) References Cited

U.S. PATENT DOCUMENTS

| 3,484,561 | A | | 12/1969 | Matthews | |
|---|---|---|---|---|---|
| 3,947,641 | A | * | 3/1976 | Trell | .......................... 348/14.01 |
| 5,046,083 | A | * | 9/1991 | Trell | ......................... 379/102.06 |
| 6,072,402 | A | | 6/2000 | Kniffin et al. | ................. 340/825 |
| 6,895,241 | B2 | * | 5/2005 | Hara | .............................. 455/420 |
| 7,065,196 | B2 | * | 6/2006 | Lee | ........................... 379/167.07 |

(Continued)

FOREIGN PATENT DOCUMENTS

GB        1474737        5/1977

(Continued)

*Primary Examiner* — Curtis Kuntz
*Assistant Examiner* — Maria El-Zoobi
(74) *Attorney, Agent, or Firm* — Jacobson Holman PLLC

(57) ABSTRACT

A method and a device for communication/control of access, the term access including access to services and or goods. According to the invention should a person wishing to use the method for obtaining access establish contact via telephone with machine or called person (B-replier); as a following step should said person, verbally or by signalling via existing keypad, request access; and as a subsequently following step evaluates contacted machine/person (B-replier) whether or not the request for access should be accepted; and as a final step, on accepted received information from the calling person, initiates called machine or person (B-replier) performance of relevant action by signalling to the required unit. When the B-replier is a person within a building, the final step is performed by a call from the B-replier to a telephone network connected device, which checks the authority of the call by means of the callers number ID against a preprogrammed list of accepted telephone numbers, and on acceptance, the B-replier can further input a code sequence by means of the keypad, which is checked by the called unit, which performs a for the specific sequence related action. According to one embodiment, the user's own mobile telephone is used for the final step, placed connected to the B-replier in a "cradle" facilitating two-way data communication between the acting unit and the B-replier.

23 Claims, 2 Drawing Sheets

U.S. PATENT DOCUMENTS

| | | | |
|---|---|---|---|
| 7,193,644 B2 * | 3/2007 | Carter | 379/102.06 |
| 2004/0229569 A1 * | 11/2004 | Franz | 379/167.05 |
| 2007/0229569 A1 * | 10/2007 | Cowling | 347/19 |

FOREIGN PATENT DOCUMENTS

| | | |
|---|---|---|
| SE | 7308086-3 | 2/1975 |
| SE | 9901299-9 | 3/2004 |
| WO | WO95/08891 | 3/1995 |
| WO | WO99/44353 | 9/1999 |
| WO | WO00/35178 | 6/2000 |
| WO | WO00/62521 | 10/2000 |
| WO | WO01/57806 | 8/2001 |
| WO | WO03/023722 | 3/2003 |

* cited by examiner

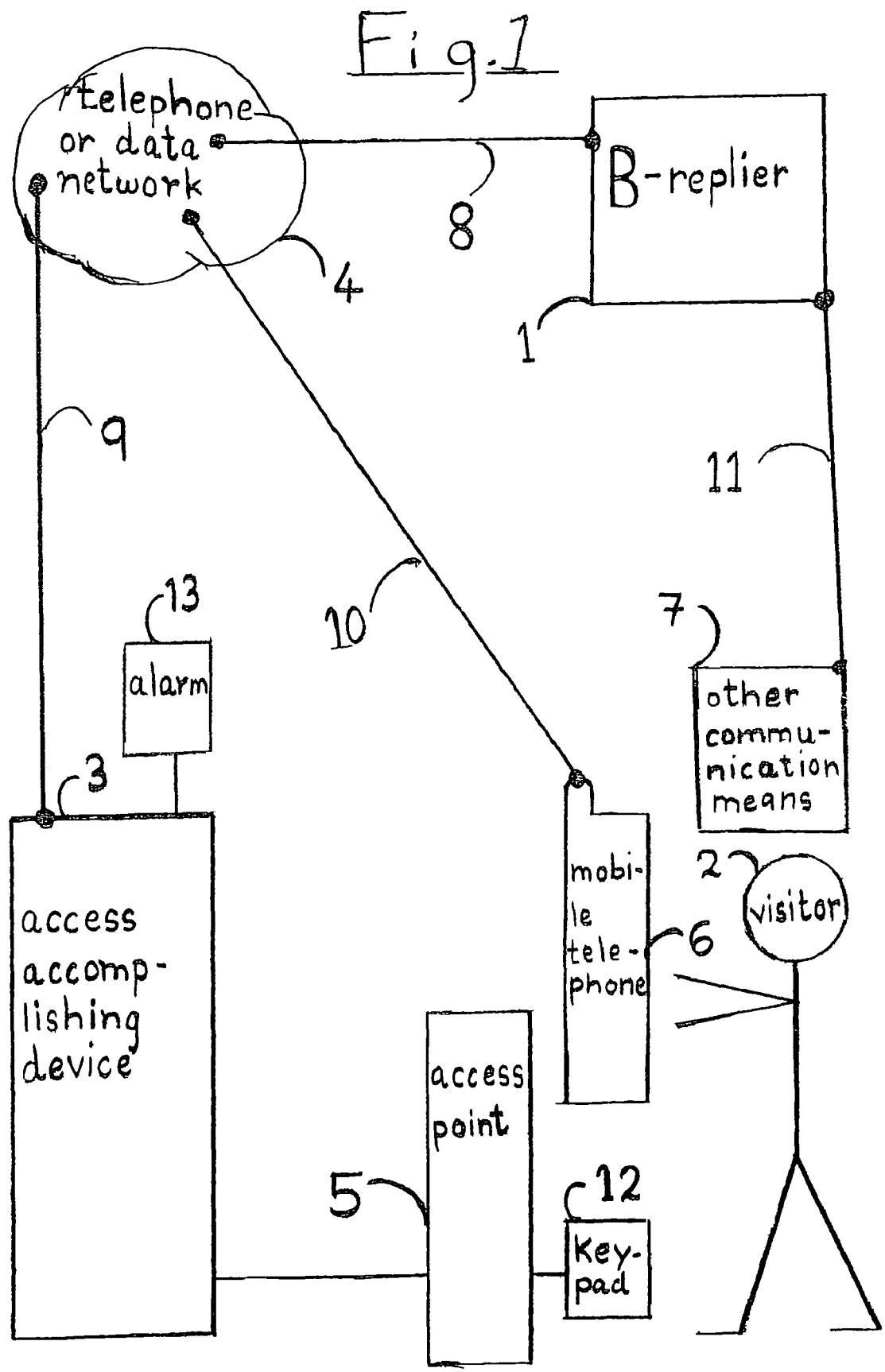

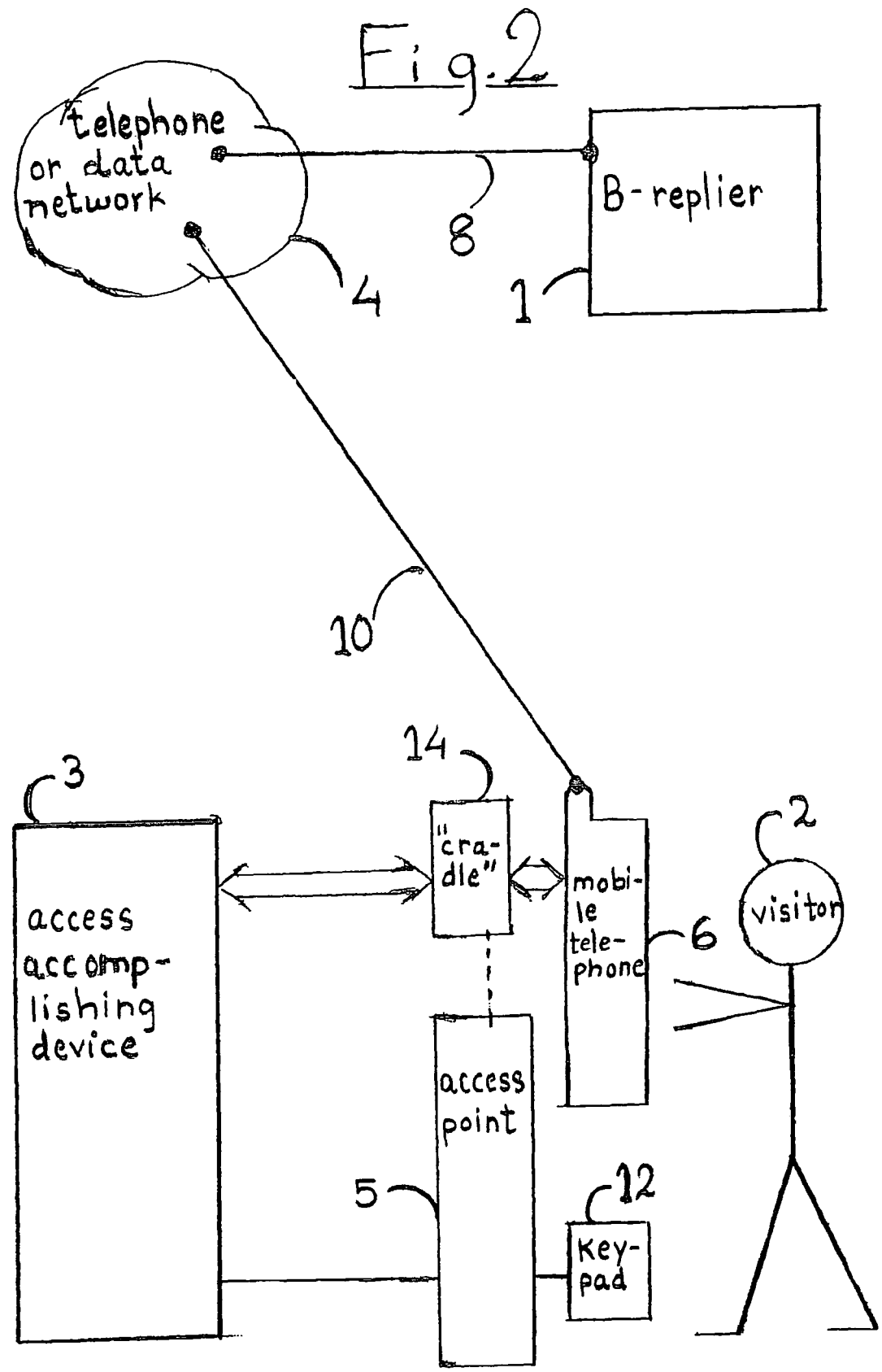

METHOD AND DEVICE FOR ACCESS COMMUNICATION/CONTROL

CROSS-REFERENCE TO RELATED APPLICATIONS

This is a nationalization of PCT/SE05/000236 filed Feb. 22, 2005 and published in English.

FIELD OF THE INVENTION

The present invention relates to a method and a device for access communication/control.

BACKGROUND OF THE INVENTION

Code locks, card readers, or such-to corresponding functions of a visiting preauthorized mobile telephone as disclosed in e.g. WO 00/62521, biometrical readers etc. all have a common disadvantage; in a varying degree they form a bar for occasional and welcome visitors/users (hereinafter "visitors"). This disadvantage is particularly obvious when visiting a tenant or similar in a locked building. Furthermore, the possibility for the visited party to make a "final" judgement/authentification based on from case to case varying situation may not exist. In order to overcome this disadvantage, in particular with regard to tenant buildings, so called entrance telephones, often combined with code locks, have been introduced, which basically can be divided into two groups: A—intercom systems, among which among which also in the trade so called 'no telephone bill' systems (e.g. U.S. Pat. No. 3,484,561), which by switching, hardwiring etc. connects to the separate incoming telephone lines of a building at the subscriber side of the Central Office switches, can be counted; and B—"entrance telephone systems" (e.g. SE 7308086-3 and its U.S. counterpart U.S. Pat. No. 3,947,641). "Hybrids" therebetween also exist (e.g. U.S. Pat. No. 5,046,083).

Group A has normally, particularly in larger installations, high complexity and considerable costs for hardware/installation, but involve no running costs as long as the system operates in intended fashion.

Group B has, despite simplicity and low initial costs, another major disadvantage, namely continues running costs, i.e. a building having such an installation involves, apart from payment of a running basic subscriber fee, also pay for completed calls, which on one hand makes it expensive, and on the other is unfair for tenants having few visitors if the running costs are divided equally and charged on top of the rent paid by the tenants.

Various solutions aimed to minimize these problems have been proposed in e.g. SE 9901299-9 and WO 99/44353, each having features that might be of interest for more advanced installations/applications, but less suited for a conventional tenant building and other more common applications.

SUMMARY OF THE INVENTION

One object of the present invention is to disclose a simple, low cost and easily installed entrance telephone solution, which does not involve high running costs, but offers good security, full speech/data communication between a calling visitor and a called tenant or similar (or for example an automatic answering machine), hereinafter stated as "B-replier"; and exclusive possibility for the called party to reply to the call, and thereafter, by own choice, perform the control function (e.g. open the entrance lock), i.e. all substantial and characteristic features of entrance telephones etc., and which advantageously can be combined with a special code lock, but also card/biometrical reader etc. (and TV camera, one or more direct intercom line, display, keypad, IR/RF-reader/transponder, speech(audio)parts and so on). Moreover, instead of a tenant for door opening, a visitor before e.g. a machine for performing some requested service can in another preferred embodiment of the present invention, be offered possibility to likeways contact a service provider, man or machine, acting as B-replier, which in its turn likeways can influence the visited machine and so perform an authorized service function, i.e. provide access, where access can include opening as well as access to services and goods.

Another object of the invention is to facilitate two-way communication between a service provider, man or machine, and a machine performing requested services, whereby a user's mobile telephone is used for establishing communication with a service provider, and as a following step, while the call is maintained, the mobile telephone is placed into a "cradle" having a microphone and a loudspeaker connected to a service providing machine, or other contrivance for short range communication with a mobile phone, e.g. IR, Bluetooth, and which so is passed on by the mobile (hereinafter commonly referred to as "cradle"), thereby establishing a two-way signal or data transfer link between the service provider and the service providing machine. On completion of accepted transmission, the service providing machine is actuated to perform requested service. While one preferred embodiment hereof for the rest maintains a to be herein disclosed conventional telephone network connection/usage, and the thus established data link primarily is used to enhance and speed up a transaction, this also makes another to be herein disclosed preferred embodiment feasible, where no own permanent connection to a signal transferring network is required for the service providing machine but by means of mentioned (and consenting) mobile telephone's regular subscription a virtual telephone network connection is instead established.

BRIEF DESCRIPTION OF THE DRAWINGS

The accompanying drawings are illustrative of two preferred embodiments of the present invention, setting forth the best mode contemplated thereof; and the reference numerals provided refer to the same parts throughout the figures.

FIG. 1 shows an exemplary and schematic representation of a herein-below described, preferred first embodiment of the present invention and wherein reference numeral 1 refers to a B-replier; 2 refers to a visitor; 3 refers to a device according to the present invention; 4 refers to a regular fixed, "landline", or mobile telephone or data network; 5 refers to an access point; 6 refers to a mobile telephone in case being used by a visitor (2) for calling a B-replier (1) to indicate presence and wish for access; 7 refers to a visitor's (2) possible other means than a telephone call in case being used for indicating presence and wish for access to a B-replier (1); 8 refers to a telephonic connection between 1 and 4; 9 refers to a telephonic connection between 4 and 3; 10 refers to a telephonic connection between 6 and 4 in case 6 is used by a visitor (2) for calling a B-replier (1) for indicating presence and wish for access; 11 refers to another communication way between a visitor (2) and a B-replier (1) in case 7 is used by the visitor for indicating presence and wish for access; 12 refers to an optional keypad; and 13 refers to an alarm option.

FIG. 2 shows an exemplary and schematic representation of a herein-below described, preferred second embodiment of the present invention and wherein reference numeral 14 refers to a "cradle".

DESCRIPTION OF PREFERRED EMBODIMENTS

With reference to the accompanying drawings and since the present invention should be able to handle numerical codes, such as telephone numbers, it will be described with reference to a preferred embodiment which is integrated with a conventional code lock, i.e. with a visitor accessible key pad 12 which in a conventional way will be seen by a visitor 2 approaching the entrance (access point) 5 (apart from perhaps instructions, a board with names of tenants etc. for this particular type of (entrance) application). In addition, cards or biometrical readers for entry of numerical code can be use at the entrance 5. The details of the cards or biometrical readers are not described further hereafter. A lock is normally connected for entrance 5 applications; for other applications other control means as required.

In difference to the disclosure made in SE 9901299-9, the present invention does not require any response to any type of direct signalling from an (adjacent) mobile telephone. No control is thus made e.g. of number input performed by a visitor. However, it offers by its signal response capacity a visitor 2 the possibility (which always exists, but without this capacity) to call by his own (mobile) telephone 6 an authorized replying party, the B-replier 1, whereafter same handles validation, active control signalling etc. A device 3 according to the present invention has namely in one preferred embodiment its own permanent connection 9 (subscription or the like and thereby allocated telephone number/address, hereinafter in the present specification and claims referred to as "telephone number") to a regular, operator administered telecommunication's network, fixed (wire/landline) or mobile telephone, data, Internet (IP); (W)LAN; pager etc., (hereinafter in the present specification and claims referred to as "telephone network" 4), which in a conventional way offers the service Caller-ID. Accordingly and as context will show, the following terms are intended to equally have the following general meanings as they are used here in the present specification, drawings and claims: "telephone or data" also means "telephone and data"; "telephone" also means "telephone or data", "telephone and data", "telephone or data instrument" or "telephone and data instrument"; and "network" can be fixed (wired) as well as mobile (wireless). A device 3 according to the present invention is able to receive calls and the "ID" information, decode and process the received calls and "ID" information. However, it is not necessary, for the actual functionality, that the device 3 according to the invention uses its telephone network connection 9 for outgoing calls (as with regard to the aforementioned Group B); typically can the device according to the invention not dial telephone numbers—only reply to incoming calls—which does not rule out that the network connection 9 can be used by e.g. caretakers, alarm diallers 13, etc. to access the telephone network 4, but then typically not in connection with the entrance telephone, other than when a combination system is implemented. A combination with alarms 13 (preferably having priority) is advantageous, since the degree of use for the telephone network connection 9 is increased and responsive control signals etc. can be sent back to alarm site.

This embodiment offers thus the visitor 2 (or rather the tenants) direct code lock services, but on top of that complete entrance telephone services with use of the visitor's own (mobile) telephone 6, on which the visitor 2 initially dials the telephone number of the tenant or similar. This can be made at a distance (in which case also by a fixed network connected telephone) or (most often) by the "entrance" 5 (in which case depression of a key on the device 3 according to the invention—even though not necessary—may start up the procedure and thus confirm proximity of the visitor 2). Should the number dialled be a number allocated to the device 3 according to the invention, the device 3 may via the number ID check the authority of the "visitor" for any possible direct function/signal response obtainable via the device 3 according to the invention, which may, particularly over a distance, be a desirable feature for the invention, perhaps in particular for applications involving apparatus/programming etc.

Should the number dialled relate to the telephone of a tenant or other service/access provider (fixed or mobile, and which should not have the service "protected number" activated in order to operate according to the invention), this party, the B-replier 1, can answer and per conversation etc. establish that it is an "entrance call". If a lock opening function or other function by the device 3 according to the invention is desired, the B-replier 1 now activates a 3-party conference call (or ends the entrance call; after possibly having instructed the visitor 2 how to proceed; if audiopart, same can then "take over" the conversation; a visitor 2 can also have used other means than a telephone—or other telecommunication's instrument like e.g. "IP-phone"; PC etc., hereinafter commonly referred to as "telephone"-call to a B-replier's corresponding telecom instrument, e.g. SMS; ring, a possibly cordless, bell; shouting; fixed time appointment, for indicating presence and wish for access 11) and dials the number to the device 3 according to the invention (or a visitor 2 can call a (mobile; mobile to mobile often cheaper or in some subscription etc. formats even free to a chosen party's number) telephone of a B-replier 1, and same can, maintaining conversation and thus supervising of entry, dial the number on another (due to very high immunity against so called caller-ID spoofing that increasingly has emerged on IP- and mobilephony and against which countermeasures are trying to find, and also cost factors, preferably traditionally fixed-"landline"-connected; and fixed to fixed often cheaper—if the device 3, as is herein on much the same grounds generally preferred, also is landline connected 9) telephone, where this number also possibly can be preprogrammed as a short number). Via its number ID a check is performed on the telephone number of the B-replier 1 against a list of programmed numbers in order establish the authority of the B-replier 1 and what response same is authorized, e.g. time zone, control means, action etc. When the authority has been established (for example, a "tenant of the building"), the device 3 will listen for control signals (and also send back its own control/status data etc.) via existing connection (for example DTM for entrance telephone systems; and more advanced duplex modem data signalling for apparatus applications), and act accordingly. Since the visitor 2 in this situation is disconnected, the above signalling takes place exclusively between authorized B-replier 1 and the device 3 according to the invention. When the device 3 according to the invention has accomplished required action, and possibly also confirmed this, the call is disconnected.

When looking at the costs, the result is: Simple technology and installation results in low costs. Connection (subscription) is the only common cost for the building and may also be favourably negotiated with one of the many today existing operators (since additional income due to call fees for calls via its network might be involved, particularly in connection with any 020 applications=free or sponsored call number). In e.g. houses with more than one entrance door, one central unit having the sole telephone network connection, can "serve" multiple doors; incoming number also carrying ID for which door.

The visitor 2 pays for his call via his telephone bill, unless the invention (probably most often in apparatus/machine applications, or small offices etc. among tenants of an apartment building) offers 020-numbers to preprogrammed B-replier(s) 1, credited when transaction is performed.

The B-replier 1 accepts the cost for its own calls to the device 3 according to the invention, and in difference to the aforementioned Group B there is no cost for a refused opening operation, since no call to the device 3 according to the invention is necessary.

Should a tenant be preprogrammed as a B-replier 1 via a mobile telephone 6 (telephones connected to a fixed network are not relevant) and brings same when leaving the building, entrance lock opening can be performed without regard to geographical position and also when no visitor has made a call, i.e. such a mobile telephone 6 can open the entrance lock for the tenant if a call is made to the device 3 according to the invention and if subsequently an opening command is made. On the other hand, this could involve a call charge (opening code via a keypad 12 is free of charge), but it offers an alternative when no keypad exists or same is disconnected (time zone operated).

In addition to the above described embodiment of a preferred embodiment can be mentioned: Even though a keypad 12 etc. accessible to visitors is not required for the entrance call function—a basic installation would actually only need to state its presence by means of an instruction, pushbutton etc., as previously described, addition of a keypad 12 has many advantages, apart from the practical operation of a code lock in general. Thus a keypad can be used for so called alarm shunt; in situ programming (where there is no modem, or using PC/laptop therefore, which otherwise is preferable, for some reason not is done); control/opening possibility for not "entryphone-programmed" tenants etc.

When used for apparatus applications, e.g. automatic machines, a keypad 12 can also be used for extended communication between visitor and B-replier 1 in a device 3 according to the invention, for example card PIN-codes etc.

The opening function command can be further protected if the B-replier 1, after having established connection with the device 3 according to the invention, e.g. by means of a special prefix or SMS (and initially authenticated by the caller-ID), activates the device 3 to receive an improvised temporary single use code, which within a certain period of time must be repeated from the keypad 12 connected to the device 3 according to the invention in order to be an accepted command, and which thereafter is no longer valid. The visitor 2 is in this case reconnected into the call and advised to dial this code on the keypad 21 of the device 3, which acts on the command, the proximity of the visitor 2 also being made certain. In an analogous manner also expected visitors (without mobile phone) can in advance be given a code which is programmed in to be valid one time (at e.g. a party, serveral) at a given time interval, as well as an essentially immediate one-time-code can be given if e.g. someone impromptu calls from a nearby pay phone. Fixed codes may thus (with individual time zone validity) be reserved only for certain authorized people, service staff, etc., whereby the risk for codes becoming known is reduced. All transactions (also entrance calls) will be "numerically linked" and may thus be saved to track improper use, if required. Sometimes the mere storing/saving of the number of a calling party, e.g. a not preauthorized mobile phone, could be sufficient criterion for allowing at least partial access, e.g. customer's entry to shop open for business but locked to the (troublesome) street, permit to buy petrol at cash petrol pumps without first going in to the counter and pay in advance, and can be further specified by customer's instructed manually repeated input of the number on actual door's, pump's etc. possible keypad.

Should a B-replier 1 use call forwarding for his telephone and still wish to maintain opening capability, the device 3 according to the invention may after a call from the preprogrammed (authorized) telephone and a suitable prefix, master code, SMS or similar be updated with relevant number (that which is forwarded to and from which an opening would be effectuated), active time period, etc. Also other real time programming of the device 3 according to the invention can be made by a telephone call (and also via modem etc.) in a similar way.

Another added feature according to the present invention for more advanced, speedy and enhanced use than what is possible by just by pushbutton operation etc. on a mobile phone or apparatus keypad can be a "cradle" 14 (or other short range communication unit) into which the visitor 2 can place his mobile telephone 6 on request from the B-replier 1 and after having completed initial communication with same. This "cradle" 14, similar to the old 1970's telephone modems has a microphone and loudspeaker and can thus in such a situation transmit/receive rather advanced data communication between a device 3 according to the invention and B-replier 1 via the visiting mobile 6, (as complement or alternative) provide for the earlier mentioned initial and also here with reciprocity possible "ID-check", and thus facilitate rather complicated transactions as services to the visitor 2, for example, issuing tickets, cash machines, payment machines for parking, automatic machines for supply of goods etc., and may be suitable for more elaborate applications, probably not for pure man-to-man-communication, such as entrance telephone installations.

Since an own permanent connection to a telephone network 4 for a device 3 according to the invention has not been mentioned in the above situation, it should be recognized that same actually does not need to exist. It can have it or not have it. It can in the latter case instead (via the cradle 14 and visitor mobile 6) occasionally "take over" the visitor's subscription and thus virtually be telephone network 4 connected per each transaction. If it has its own permanent telephone network 4 connection and given telephone number, which however is more expensive both by its then construction and connection, it can then be called by the B-replier 1 as above earlier described, the B-replier's authority being cleared by the caller-ID, and the cradle 14 link merely used for complementing same and/or enhancing etc. a transaction (e.g. mobile connections are speedier than landline). If it doesn't have these own permanent features, all authority ID-data can be fully included in the transaction signal/data cradle 14 link connection and communication. A user 2 with a mobile telephone 6 calls a number stated by the installation 3 which includes the "cradle" 14 and receives contact with a machine/person 1 requesting information of the user's desired purchase, credit card number and similar. When communicating with a machine, choice and input of information can be made via the keypad of the mobile telephone 6. When required information relating to the transaction has been inputted/accepted, the user 2 receives a request to place the mobile telephone 6 in the "cradle" 14 (not disconnected) and to, for example, depress a button adjacent to the "cradle" 14. Hereby the local unit installation 3 is "lended" the visitor's subscription and call, and becomes thus telephone network 4 connected/linked (per 020-number the "loan" can be repaid, and can the couple thus with fair business ethics also be used for apparatus update/programming etc. in real time, and if speech audio part, also conversation can be by command upheld). Hereafter communication takes place between the local unit 3 and called unit 1 according to a predetermined signalling protocol, preferably by a signal modem. In order to ensure required security, the communication can be coded, including a coded check sum, or authenticated in other known way. When communication has been completed (and user 2 possibly made a payment transaction), the user 2 may, for example, receive a message from the local unit 3 to remove the mobile telephone 6 from the "cradle" 14 and to terminate the call. Hereafter can the local unit 3 print a ticket or other type of verification or service for intended purpose. This might be suitable in cases when, for example, an own permanent connection to a telephone network 4 is difficult/vulnerable to abuse or the application does not motivate the extra cost and administration involved for an own permanent connection to a telephone network 4.

As example of a related embodiment can, for example, be mentioned the possibility to use units 3 not connected to a telephone network 4 in connection with holiday cabins, hotels and similar, whereby a user 2 can establish connection to an administrative centre 1 via the mobile telephone 6, and request to rent a cabin, room or similar. After acceptance of the transaction, which may include transfer of e.g. credit card information from a user 2, the mobile telephone 6 is placed in the aforementioned "cradle" 14, whereafter required information for permitting access is transferred. The local unit 3 may now as an alternative for example perform lock opening, but same may also be equipped to manufacture a "key" to the rented object, which for example can be a printout of a bar code, a card with an information carrying magnetic strip, or a punched key card. Such a key may obviously also include information relating to the length of the rented period, and when said period expires be blocked against further use. Such an embodiment means that the local unit 3 does not require any own permanent fixed or mobile telephone network 4 connection, since communication between administrative central unit 1 and local unit 3 is carried out utilizing the mobile telephone 6 of a user 2. Similar applications may involve issuance of tickets and other documents, delivery of goods from vending machines, etc., based on information transferred between an administrative centre 1 and the machine 3 having the above mentioned "cradle" 14, and especially perhaps in countryside installations.

Should the invention be used for a building having its own local exchange, it may be arranged in such a fashion that all extensions can open free of charge during office hours and (typically in night mode and with relevant preprogrammed home numbers) also from home, which would however normally involve a call charge for opening.

With regard to buildings having only single or a few tenants (and just one telephone line), the costs involved for a separate telephone network subscription would be a disadvantage. However, with an ISDN subscription, one of the channels can be used without any additional cost. Furthermore, mobile and fixed telephone network subscriptions (refill or invoiced) are today offered with two telephone numbers, whereby one can be used to check the number ID from the other. WLAN-telephones are also more frequently used, and involve often a PABX function, which makes it possible to connect a further individual identity (number). Should one of these extensions be used by the device according to the invention, access can be controlled by the other. More hypothetically, perhaps the "off hook" caller-ID variant (which give the ID of a calling party even when a call is on, it is also called "call-waiting" ID, and is presently implemented in a few countries) could be used, meaning that caller-ID could be given also when calling one self, so to say. Much depends here on how the actual network operator now and henceforth shapes and provides it's caller-ID service (at present there is no common "global" standard), as also how future telecommunication's systems may be configurated; and it could thus be here appropriate to generally state that the thought/scope of the present invention is felt to be valid evenso, as also should certain elements/features of this invention be placed centrally (in CO/base station/server/etc.) by the operator.

It is also possible to avoid call charges for a request to open the entrance lock. When the B-replier 1 has talked to a visitor 2 and wishes to allow access, a call to the device 3 according to the invention would indicate the number ID (Caller-ID) to the call receiving device 3, which could be set to only answer incoming calls after a certain number of ring signals, e.g. five.

Should the B-replier 1 terminate the call earlier, e.g. after two ring signals, such an action could be interpreted as a direct command to unlock the entrance door. Since the called device 3 receives the number of the calling party 1 without answering the call, the ID can be checked and approved as an authorized B-replier 1, and the short call period (2 ring signals) in combination with received ID would be a command to open the entrance door lock. No call charge would be involved.

On the other hand, should the B-replier 1 allow (in this example) five ring signals, the called device 3 will answer the call, and the ID-validated B-replier 1 would now be able to perform service requests (i.a. opening) by inputting predetermined code sequences per DTMF. This means that normally a call charge is involved, whereas simple lock opening commands (as described above) would be free of charge. A B-replier 1 can (by programming) individually define whether its number immediately should lead to direct access or service requests/signalling, and shifts therebetween can also be timezoned. This could be advantageous for e.g. tenants and nighttime. A more basic embodiment, always jsut giving direct access without taking the call, is also readily feasible. Also, by counting the ring signals without taking the call, at least two different actions can be taken free of charge, e.g. open for less than 3 and activate a code lock sequence for more than 5 signals. If the called device 3 (in e.g. apartment buildings) have two incoming lines (numbers), one number called could provide direct access free of cost, while the other number could be put to take its call (at a cost) and so (after ID-check) allow more advanced control signalling, programming etc. Two (or more) incoming lines obviously also generally would increase the over-all capacity of larger installations. One can also here mention that if the "off hook" caller-ID service is available with installations where one central called device unit 3 (having only one incoming line 9) is to handle several access points, direct access could be given to one point (by the "off hook"-ID), even when the central unit is busy on the telephone line 9 with a more elaborate and time consuming access signalling for another. If only direct access is on, though, handling times are so short that conflicts are unlikely, and so "off hook" caller-ID would not be very vital; and concurring code/card/etc. access can of course also be handled.

With regard to entrance telephone systems, and other existing systems for control and access, such as for instance intercoms (group A), code/card/biometrical readers, telephone entry systems (group B), mere pushbutton or remote control operated electrical door strikes (all hereinafter commonly referred to as "access control systems"), the method according to the present invention can in most cases be implemented with major parts of previous installation unchanged. It is also possible to modify such earlier installations in such a way that previous system is maintained in parallel with the method according to the invention. As a result, for example, certain tenants may prefer to use the cost effective method according to the present invention, whereas other tenants may prefer to use existing system, e.g. with entrance calls being switched through via the public telephone network to their ordinary telephone.

Whereas thus preexisting access control systems can be upgraded to include the present invention, as well as someplace basic entry/access control can be newly established by applying an according to the invention relevantly programmed and organized common caller-ID device, a separate advantageous embodiment of the present invention, primarily useful for apartment buildings, gated communities etc., is realized, which is already when manufactured built to combine "classical" telephone entry with the present invention's essentially as hereinabove disclosed caller-ID concept, into one integrated system. It will need just one telephone line and number for performing "both ways", and since it for the classical dial-up modality needs both microphone and speaker and also a keypad, same can be used also for maintaining conversation in a "dial-down" caller-ID version communication (by preprogram or letting e.g. five signals go and then by DTMF command activate the speech), and for code lock use. Each B-replier's choice of modality and available features can be individually assigned per programming, and also time zoning hereof is possible. E.g. small offices, surgeries, can have both ways at the same time, accepting the (separately billed) charges for dialling up by the system by customers without mobile phones, as well as giving customers 2 with mobiles 6 the convenience of not having to stand outside before the entrance 5 the whole time of dial-up, conversation and unlock, but being able to do much of it on approach. Normally, then, dial-up by the system to B-repliers 1 having chosen caller-ID modality, is not allowed (and so they may be spared from running call charges of others). Since however the system 3 would have a telephone number, that same easily reocgnisable number will appear for a called B-replier 1 having a caller-ID (even busy in a call, if off hook ID). This can be separately used (most likely quite infrequent, and programmable, and for just B-repliers 1 having chosen their telephone numbers to be thus accessible; but mentioned here just as a technical possibility within the inventive thought) to giving visitors 2 a possibility to call such B-repliers 1 by the system, free of cost. When such a B-replier 1 number is thus called, it can ring very shortly and then break, i.e. before reply and thus cost. But the B-replier 1 is now by the caller-ID (which furthermore can be of the standard type having a so called VIP-number facility=audio/opto alert for some programmed number, and/or facility for automatic dial of last incoming number) intimated of the call, and can in its turn call up the system 3, either direct give access, or entering into speech/signalling phase.

Alarm control systems (to-day almost all telephone linked), especially surveillance systems type fire, medical/elderly care etc., have so far had problems with legitimate access (entry) for personnel at call to actual alarming site, if locked. At e.g. fire brigade call, must often a special unit bringing a great number of coded keys, whereof one is supposed to open the door, arrive, so that the entranced door should not have to be forced by fire axes etc. This is a both administrative and cost problem and with uncertain synchronization. By integrating, or complementing with, a device 3 according to the present invention into an alarm control system, a solution hereto would with good congruence and security be given, by synergic call-up from an area-wise inprogrammed operative center, and thus can opening be effectuated at received authorized ID. This also has the advantage over distributed (e.g. per local personnel's probably diverse numbers) authentication, that only a few numbers which furthermore always can be expected to be at hand, here need to be inprogrammed for the whole area, town etc. Also caller-ID authenticated steering, programming, operation control etc. as earlier herein described can advantageously be here implemented, and can combined with i.a. entry control as hereinabove described, lead to fully integrated systems for building management, also including such things as caller-ID administrated booking of laundromats, swimmingpools, gyms etc. Above described integration/complementing can be done at manufacture or as a retro-fit.

Also more service orientated entry, like postal etc. delivery, can in an analogous way be provided, better safeguarded than today's postal locks/codes etc. against unwanted circulation of "keys", either distributed, by the deliverer's own relevantly inprogrammed standard or specially adapted (perhaps just having a telephone number, line seizing and dialling) telecom instrument; or centrally, by en route addressing a central which thereupon by its (for all actual entrances jointly inprogrammed and, as in most cases hereinabove, preferred landline) telephone, can execute an authorized opening call-up to directed entry installation, preferably landline connected.

The fact that SMS and EMS/MMS arrives on the same signal protocol as Caller-ID (FSK) and starting with same, nowadays also on landline phones and in real time (without lag), means that they readily can be received and decoded by the present invention for giving a calling party (authorized by the initializing caller-ID when calling from the "home" telephone) possibility for the cost of one such message to comprehensively programming and commanding a device according to the present invention, and so they are meant included in the inventive thought herewith. When not calling from the home phone, all authentication ID can be safely included in the message and the invention, knowing it to be an SMS, can ignore the preceeding caller-ID. It can also be used, however, to create a transaction record; check it against a list of preauthorized numbers; call back upon completion of desired action as a receipt and which could consist of either just the invention's own telephone number, readable as a caller-ID for the first calling party (even without same taking the call so no cost is incurred), or be sent as an SMS back to same. Protocols like this can also apply for all other embodiments above.

The present invention is thus not restricted only to applications relating to entrance telephone applications and similar, since the principles disclosed for access control to a building also can be used for various types of safe transactions with use of a mobile telephone, and with a device according to the invention communicating with a fixed telephone network, a mobile telephone network, as well as without any own network connection (cf. the example of a key delivering machine described earlier).

The invention claimed is:

1. A method for communication and control of access by means of an access accomplishing device having an allocated telephone number, said device being connectible to a regular telephone or data network offering a Caller-ID (Caller identification) service and being able to accept incoming calls as well as Caller-ID information, decode and process the same, said method comprising the steps of:

(a) establishing contact with a "B-replier" by a visitor who is not preauthorized for access through using a communication means of the visitor that is different from said device, wherein said visitor requests access and said B-replier is an authorized party, other than said device, with authority to grant or deny access;

(b) in case said visitor has established contact with said B-replier by means of a telephone call to a telephone of said B-replier by using said telephone of said B-replier, said B-replier will dial a telephone number of said device and said requested access accomplished by said device is desired, ascertaining by said B-replier that said visitor's said call is ended;

(c) dialing by said B-replier the telephone number of said device, thereby calling said device and indicating said B-replier's Caller-ID to said device, by means of a telephone over a connection to said regular telephone network which does not have a "protected number" service activated by said B-replier's own choice when said B-replier wishes to grant said visitor said requested access;

(d) checking, by said called device via said indicated Caller-ID, the telephone number of said B-replier against programmed numbers in order to establish the authority of said B-replier for having said requested access for said visitor accomplished; and (e) upon established authority, accomplishing by said device said requested access for said visitor.

2. The method according to claim 1, wherein said called device answers the call, thus enabling said Caller-ID-validated B-replier to perform service function requests by inputting predetermined code sequences per DTMF or modem data signaling.

3. The method according to claim 1, wherein said B-replier separately accomplishes any of at least two different actions by varying the time that said B-replier lets the ringing go on.

4. The method according to claim 1, wherein said B-replier performs input or activation of a code which during a predetermined period of time can be used as an activating code by an outside keypad for gaining access.

5. The method according to claim 1, wherein said visitor's communication means is a mobile telephone.

6. A device for communication and control of access utilizing the method of claim 1, which said device for communication and control of access is connectible with an allocated telephone number to a regular telephone or data network which offers the service of Caller-ID and said device for communication and control of access can accept incoming calls as well as Caller-ID information, decode and process the same, said device for communication and control of access comprising:

a communication means, that is different from said device for communication and control of access, of an access requesting visitor which communication means is operable to establish a direct communication with an authorized party other than said device for communication and control of access, "B-replier";

wherein said B-replier is operable to accept said visitor and in such case to initiate said requested access, by making a regular telephone call via a regular telephone or data network to said thereby connected device;

wherein said device for communication and control of access checks via Caller-ID information indicated at such a call the telephone number of said B-replier against a list of programmed numbers in order to establish the authority of said B-replier for initiating said requested access for said visitor; and wherein said device for communication and control of access upon established authority accomplishes said requested access for said visitor.

7. The device of claim 6, wherein said communication means is a mobile telephone.

8. The device of claim 6, wherein said requested access comprises unlocking.

9. The device of claim 6, being combined with at least one in/out-put means of a type selected from the group consisting of a code lock, a keypad, a card reader, a biometric reader, an IR transponder, an RF transponder, an audio part, a video part, a speech part, a modem, a computer interface, a (W)LAN port, an alarm and a direct line interface.

10. The device of claim 7, wherein said mobile telephone effectuates access by making a direct regular call to said device and thus indicating said mobile telephone's Caller-ID.

11. The device of claim 6, wherein said B-replier effectuates access without communication with a visitor by making a regular call to said device.

12. The device of claim 6 combined with or integrated in at least one system of the type selected from the group consisting of an access control system, a telephone entry system, a door intercom system, an alarm control system, a surveillance system, and a building management system.

13. The device of claim 6, wherein said B-replier by programming can bestow an occasional authority on a telephone for making a call and effecting access.

14. The device of claim 6, wherein several access points are handled by a single connection to a said regular telephone or data network.

15. The device for communication and control of access according to claim 9, further comprising a contrivance for short range communication, which can reciprocally interact with a closely located mobile telephone; that said device connects to said regular telephone or data network by means of said closely located mobile telephone being connected up to said B-replier; and that said B-replier in such a case, instead of making a regular call, transfers required information for permitting access via the established connection to said device; and that said device thereupon accomplishes said requested access for said visitor.

16. The method according to claim 1, wherein said access comprises unlocking.

17. The method according to claim 1, wherein said access comprises programming.

18. The method according to claim 1, wherein said device can make a call.

19. The method according to claim 1, wherein communication between said device and a calling party is completely or partially communicated as SMS, EMS or MMS.

20. The method according to claim 5, wherein the steps (b) through (e) involve that the visitor places the mobile telephone against a contrivance for short range communication with said device while maintaining a switched through connection to the B-replier thereby providing a two-way signaling line connection between the B-replier and said device per which line the B-replier can take up its own communication with said device, the method further comprising that information between said device and the B-replier is exchanged via thus established communication; and that after required and approved step with transfer of information, said device accomplishes printout, dispensing or effectuation of ticket, document, goods, service or other access requested by the visitor during the contact with the B-replier.

21. A method for communication and control of access by means of an access accomplishing device that, either with an allocated telephone number, can be connected to a regular telephone or data network that offering a Caller-ID (Caller identification) service or lacking such own connectability, said method comprising the steps of:
(a) establishing contact with a "B-replier" by a visitor who is not preauthorized for access through using a mobile telephone of said visitor, wherein said visitor requests access and said B-replier is an authorized party other than said device, with authority to grant or deny access;
(b) placing by said visitor said mobile telephone against a contrivance for short range communication with said device while maintaining a switched through connection to said B-replier established by means of said contact thereby providing a two-way signaling line connection between said B-replier and said device per which line said B-replier can take up its own communication with said device, further comprising, that information between said B-replier and said device is exchanged via thus established communication; and that, after required and approved exchange of information, said device accomplishes printout, dispensing or effectuation of ticket(s), document(s), goods, service(s) or other access requested by said visitor during said contact with said B-replier.

22. The method according to claim 3, wherein one said action comprises unlocking.

23. The device according to claim 15, wherein the contrivance for short range communication comprises a speaker and a microphone.

* * * * *